US010863397B2

(12) United States Patent
Dhanani et al.

(10) Patent No.: US 10,863,397 B2
(45) Date of Patent: Dec. 8, 2020

(54) OPPORTUNISTIC USE OF THE CELLULAR CAPABILITIES OF A PAIRED DEVICE

(71) Applicant: APPLE INC., Cupertino, CA (US)

(72) Inventors: Tarakkumar G. Dhanani, San Jose, CA (US); Srirang A. Lovlekar, Cupertino, CA (US); Alosious Pradeep Prabhakar, Singapore (SG); Vijay Venkataraman, San Jose, CA (US); Murtaza A. Shikari, Mountain View, CA (US); Ajoy K. Singh, Cupertino, CA (US); Vijay Gadde, San Jose, CA (US); Longda Xing, San Jose, CA (US); Nishit S. Sheth, Dublin, CA (US); Rohit Thareja, Redwood City, CA (US); Sethuraman Gurumoorthy, San Jose, CA (US); Srinivasan Nimmala, San Jose, CA (US); Sharad Garg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/406,373

(22) Filed: May 8, 2019

(65) Prior Publication Data

US 2020/0359278 A1 Nov. 12, 2020

(51) Int. Cl.
*H04W 36/00* (2009.01)
*H04W 36/30* (2009.01)
*H04W 76/15* (2018.01)
*H04W 4/80* (2018.01)

(52) U.S. Cl.
CPC ......... *H04W 36/0069* (2018.08); *H04W 4/80* (2018.02); *H04W 36/30* (2013.01); *H04W 76/15* (2018.02)

(58) Field of Classification Search
CPC . H04W 36/0069; H04W 36/30; H04W 76/15; H04W 4/80
USPC .......................................................... 455/436
See application file for complete search history.

(56) References Cited

U.S. PATENT DOCUMENTS

| 7,822,439 B2* | 10/2010 | Teicher | H04M 1/72527 455/558 |
| 8,060,139 B2* | 11/2011 | Yaqub | H04W 8/20 455/558 |
| 9,820,085 B1* | 11/2017 | Telang | H04W 76/14 |
| 10,075,832 B2* | 9/2018 | Uno | H04W 4/80 |

(Continued)

*Primary Examiner* — Mong-Thuy T Tran
(74) *Attorney, Agent, or Firm* — Fay Kaplun & Marcin, LLP

(57) ABSTRACT

A device, system and method for a user equipment (UE) to opportunistically utilize the wireless capabilities of a paired device. The UE is configured to establish a first cellular network connection based on a first subscription, a second cellular network connection based on a second subscription and a connection to a further UE based on a short-range communication protocol. The UE identifies a predetermined condition and transmits an indication to the further UE based on the predetermined condition. The further UE establishes a further cellular network connection in response to the indication and the further cellular network connection is based on one of the first subscription or the second subscription. The UE then declares no service for one of the first cellular network connection or the second cellular network connection based on the further cellular network connection.

20 Claims, 7 Drawing Sheets

(56) References Cited

U.S. PATENT DOCUMENTS

| | | | |
|---|---|---|---|
| 10,511,805 B2* | 12/2019 | Taylor | H04L 65/1069 |
| 2004/0042442 A1* | 3/2004 | Pecen | H04W 12/04 |
| | | | 370/352 |
| 2013/0237197 A1* | 9/2013 | Ruvalcaba | H04W 8/183 |
| | | | 455/418 |
| 2014/0204834 A1* | 7/2014 | Singh | H04W 40/22 |
| | | | 370/315 |
| 2015/0098445 A1* | 4/2015 | Chakravarthy | H04W 36/14 |
| | | | 370/331 |
| 2016/0262094 A1* | 9/2016 | Khay-Ibbat | G06F 1/163 |
| 2016/0262191 A1* | 9/2016 | Flynn | H04W 76/10 |
| 2017/0055195 A1* | 2/2017 | Ingale | H04W 36/22 |
| 2017/0064752 A1* | 3/2017 | Veikkolainen | H04W 76/19 |
| 2017/0070919 A1* | 3/2017 | Verger | H04L 65/1083 |
| 2017/0078786 A1* | 3/2017 | Schobel | H04W 76/10 |
| 2017/0134945 A1* | 5/2017 | Goel | H04W 48/18 |
| 2019/0159018 A1* | 5/2019 | Basu Mallick | H04W 24/08 |

* cited by examiner

OPPORTUNISTIC USE OF THE CELLULAR CAPABILITIES OF A PAIRED DEVICE

BACKGROUND

A user equipment (UE) may be equipped with a plurality of subscriber identification modules (SIMS) and each SIM may enable the UE to establish an independent network connection. For example, the UE may be equipped with a first SIM and a second SIM for dual-sim dual-standby (DSDS) functionality. When in a DSDS operating mode, the UE may establish a first network connection using the first SIM and a second network connection using the second SIM. However, the UE may be configured to use the same hardware, software and/or firmware components to perform operations related to each network connection. Thus, when the UE is utilizing a component to perform an operation related to the network connection associated with one SIM, that component is not available to perform an operation related to the network connection associated with the other SIM. Accordingly, when in the DSDS operating mode, performing an operation related to the network connection associated with one SIM may cause the UE to be unable to perform an operation related to the network connection associated with the other SIM.

The UE may also be paired with a further UE via a short-range communication protocol. For example, the UE may be a source device and the further UE may be an accessory device. The source device and the accessory device may communicate via the short-range communication protocol to perform various operations. However, under conventional circumstances, when the source device has established a plurality of network connections (e.g., DSDS operating mode) the capabilities of the connected accessory device are not efficiently utilized.

SUMMARY

According to an exemplary embodiment, a method may be performed by a user equipment (UE) configured to establish a first cellular network connection based on a first subscription, a second cellular network connection based on a second subscription and a connection to a further UE based on a short-range communication protocol. The method includes, identifying a predetermined condition and transmitting an indication to the further UE based on identifying the predetermined condition. The further UE is configured to establish a further cellular network connection in response to the indication and the further cellular network connection is based on one of the first subscription or the second subscription. The method further includes, declaring no service for one of the first cellular network connection or the second cellular network connection based on the further cellular network connection.

According to another exemplary embodiment, a method may be performed at a user equipment (UE) configured to connect to a further UE based on a short-range communication protocol, wherein the further UE is configured to establish a first cellular network connection based on a first subscription and a second cellular network connection based on a second subscription. The method includes, receiving an indication from the further UE and in response to the indication, establishing a further cellular network connection. The method further includes, performing an operation related to the further cellular network connection, wherein the further cellular network connection is based on one of the first subscription or the second subscription.

According to a further exemplary embodiment, a user equipment (UE) includes a transceiver, configured to establish a first network connection based on a first subscription and a second network connection based on a second subscription. The UE further includes a processor configured to perform operations. The operations comprising, identifying a predetermined condition and transmitting an indication to a further UE based on identifying the predetermined condition. The UE is connected to the further UE based on a short-range communication protocol and the further UE is configured to establish a further cellular network connection in response to the indication. The further cellular network connection is based on one of the first subscription or the second subscription. The operations further comprising, declaring no service for one of the first cellular network connection or the second cellular network connection based on the further cellular network connection.

DETAILED DESCRIPTION

Figure 1:
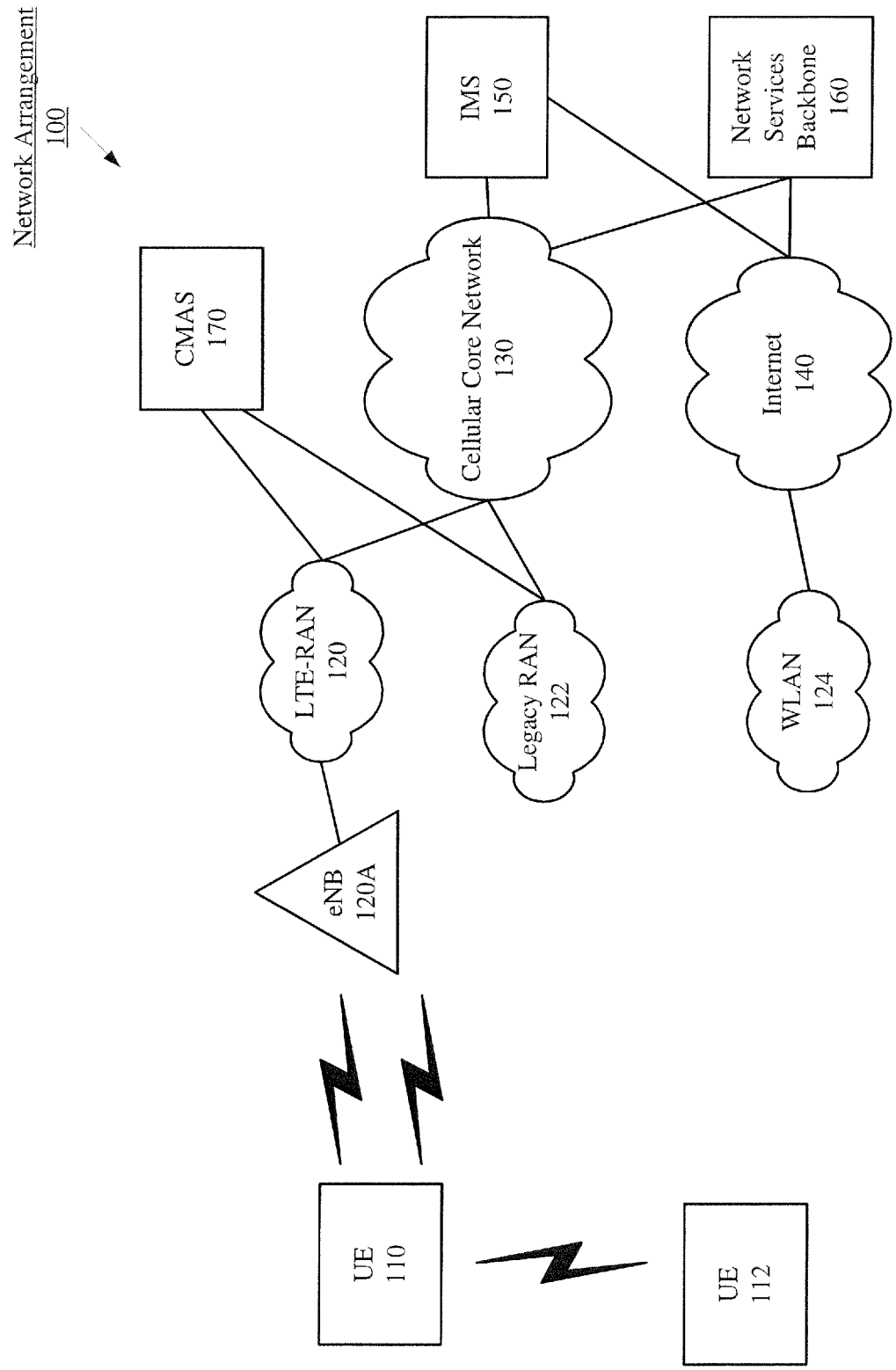
FIG. 1 shows an exemplary network arrangement according to various exemplary embodiments described herein.

The exemplary embodiments may be further understood with reference to the following description and the related appended drawing's, wherein like elements are provided with the same reference numerals. The exemplary embodiments describe a device, system and method to improve network connectivity for a user equipment (UE) that is capable of supporting a plurality of network connections and paired with a further UE via a short-range communication protocol.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may establish a connection to a network by camping on a cell of the network. In one example, the network may be a Long Term Evolution (LTE) network and the cell may be an Evolved Node B (eNB). However, reference to a particular network or a particular type of cell is merely provided for illustrative purposes, those skilled in the art will understand that the network may be any type of network and the cell may be any type of cell within the corresponding network.

Various exemplary embodiments are described with regard to a UE that is equipped with a first subscriber identification module (SIM) and a second SIM for dual-sim dual-standby (DSDS) functionality. When in a DSDS operating mode, the UE may establish a first network connection using the first SIM and a second network connection using the second SIM. The first and second network connections may each be independent from one another and exist simultaneously. Thus, each SIM may be associated with its own telephone number and/or subscription with a cellular service provider. Accordingly, DSDS enables a single UE to be associated with two different telephone numbers and/or subscriptions. Throughout this description, for the purposes of differentiating between SIMs, reference will be made to SIM 1 and SIM 2. However, this is only intended to differentiate between the two SIMs and is not intended to indicate any sort of priority/preference between either SIM 1 or SIM 2.

A person of ordinary skill in the art would understand that a SIM contains information that is required for a UE to establish a network connection. For example, the SIM may include an international mobile subscriber identifier (IMSI) that may be used for authentication with the network provider. In the context of DSDS, a user may have a first subscription with a cellular service provider that is enabled by SIM 1 and a second subscription with the cellular service provider that is enabled by SIM 2. In one example, the same cellular service provider is associated with both SIM 1 and SIM 2. In another example, a different cellular service provider is associated with each SIM. Reference to any particular type of information being included in a SIM is merely provided for illustrative purposes. A SIM may include a wide variety of different types of information that different networks or entities may refer to by different names. Accordingly, the exemplary embodiments may apply to a SIM that contains any type of information used by the UE to establish a network connection.

Throughout this description, it will be described that the SIMs are in a state, e.g., standby state, active state, etc. It should be understood that this state refers to a state of the connection of the UE to a network that is associated with the particular SIM. A SIM may be characterized as being in a standby state. When the SIM is in the standby state, the UE is generally not exchanging data over the corresponding network connection. However, the UE may be listening for transmissions from the network over the corresponding network connection. Thus, the UE may perform various operations related to network connection associated with the SIM. These operations may include but are not limited to, monitoring for paging messages, listening for emergency messages, collecting measurement data, performing operations related to mobility management, idle mode operations, etc. Accordingly, each SIM is available to be selected by the UE for various network services. For example, when SIM 1 and SIM 2 are in the standby state, the UE may select one of SIM 1 or SIM 2 with which to initiate/receive a voice call, utilize short message service (SMS), utilize multimedia message service (MMS), access a data service, etc. As will be described below, when an exchange of data occurs between the UE and the network over the network connection associated with a particular SIM, that SIM may be characterized as being in the active state.

Conventionally, the UE may utilize the same hardware, software and/or firmware components to perform operations related to the network connection associated with SIM 1 and the network connection associated with SIM 2. For example, the UE may be configured to use the same transceiver to perform operations related to both network connections. Using the same component for both network connections may create scenarios in which the UE is unable to perform an operation related to the network connection associated with one of SIM 1 or SIM 2 because the UE is currently using that component to perform an operation related to the network connection associated with the other SIM.

When both SIM 1 and SIM 2 are in the standby state, the UE may transition between performing an operation related to the network connection associated with SIM 1 and performing an operation related to the network connection associated with SIM 2. As mentioned above, sharing components between both network connections may create instances in which performing an operation related to the network connection associated with one SIM may cause the UE to be unable perform an operation related to the other network connection. However, due to the frequency and duration in which operations related to a network connection associated with a SIM in the standby state are performed, there is ample time for the UE to transition between performing an operation related to the network connection associated with SIM 1 and an operation related to the network connection associated with SIM 2 without creating an inadequate user experience for the subscription associated with either SIM.

Throughout this description, a SIM may also be characterized as being in an active state. When a SIM is in the active state, the UE is exchanging information and/or data over the corresponding network connection. The exchange of information and/or data enables the UE to perform functionalities normally available via the network connection. For example, the SIM may be in the active state when the UE is sending/receiving data during a voice call over the corresponding network connection. In another example, the SIM may be in the active state when the UE is utilizing an Internet protocol (IP) based service (e.g., sending/receiving payload data, streaming audio, streaming video, etc.) over the corresponding network connection. Any reference to standby state and active state are merely provided for illustrative purposes, different networks and entities may refer to similar types of states for a SIM by different names.

When a SIM is in the active state, the UE is utilizing a hardware, software and/or firmware component to perform an operation related to the network connection associated with the SIM. As mentioned above, this may cause the UE to be unable to perform an operation related to the network connection associated with the other SIM. Accordingly, when one SIM is in the active state, the user experience for the subscription associated with the other SIM may be negatively impacted.

To provide a general example of a conventional DSDS operations, consider the following exemplary scenario. The UE is in a DSDS operating mode and camped on a cell of a corresponding network. SIM 1 is in the standby state and SIM 2 is in the standby state. As mentioned above, the network connection associated with SIM 1 and the network connection associated with SIM 2 are independent from one another. Accordingly, in certain configurations, the UE may camp on a single cell for both network connections. In other configurations, the UE may camp on one cell for the network connection associated with SIM 1 and camp on a different cell for the network connection associated with SIM 2.

If one of the SIMs transitions to the active state, the user experience for the subscription associated with the other SIM may be negatively impacted. For example, when SIM 1 is in the active state, the UE may utilize its transceiver to send/receive data over the network connection associated with SIM 1. Thus, the transceiver may not be available to be utilized to perform operations related to the network connection associated with SIM 2(e.g., monitor for paging, listen for emergency messages, receive a voice call for the telephone number associated with SIM 2, perform an operations related to mobility management, etc.). From the user perspective, if SIM 1 is in the active state for a short duration, the user experience for the subscription associated with SIM 2 may not experience any noticeable adverse effects. For example, if SIM 1 transitions from the standby state to the active state to receive a SMS and then transitions back to the standby state after the SMS is received, SIM 2 may only be unavailable for a short duration.

In certain conventional configurations, when one of the SIMs is in the active state and/or configured to be used to access a particular service for more than a predetermined amount of time, the other SIM may transition into a suspended state. When a SIM is in the suspended state, the network connection associated with the SIM is in no service. The UE may transition one of the SIMs into the suspended state and declare no service over the corresponding network connection to ensure that the shared components may be dedicated to the network connection associated with one of the SIMs. For example, initially, SIM 1 and SIM 2 may both be in the standby state. Subsequently, the user may elect to participate in a voice call using the telephone number associated with SIM 1. In this example, to ensure that the shared components are available to perform operations related to the voice call being performed over the network connection associated with SIM 1, the UE may transition SIM 2 into the suspended state. Any reference to a SIM being in the suspended state is merely provided for illustrative purposes, different networks and entities may refer to a similar type state by a different name.

The UE may also be configured to connect to a further UE via a short-range communication protocol. When connected, the UE and the further UE may exchange information and coordinate operations to perform various functionalities. Like the UE, the further UE may be any electronic component that may establish a connection to a network and is configured with the hardware, software, and/or firmware to exchange information and data with the network. For example, the UE may be a source device and the further UE may be an accessory device.

An accessory device may directly connect to the cellular network. Like the UE, the further UE device may be equipped with a SIM. The exemplary embodiments are described with regard to the further being provisioned with an embedded SIM (eSIM). The eSIM is an integrated circuit that is embedded in the UE and is not intended to be physically removed from the UE. In contrast, a SIM is an integrated circuit that is capable of being physically inserted and removed from a device. However, reference to the further UE including an eSIM is merely for illustrative purposes, the further UE may include a SIM.

The eSIM of the further UE may be a clone of the SIM of the UE. Thus, the UE and the further UE may be associated with the same telephone number and/or subscription. The further UE may be equipped with more than one eSIM. Thus, the further UE may be equipped with an eSIM that is a clone of SIM 1 and/or an eSIM that is a clone of SIM 2. Throughout this description, an eSIM that is a clone of SIM 1 may be referred to as eSIM 1 and an eSIM that is a clone of SIM 2 may be referred to as eSIM 2. Further, it should be noted that SIM 1 and/or SIM 2 may be an eSIM. Accordingly, reference to SIM 1, SIM 2, eSIM 1 and eSIM 2 is only intended to differentiate between the SIMs of the UE and the SIMs of the further UE. The exemplary embodiments may apply to any combination of SIMs and eSIMs between the UE and the further UE.

The exemplary embodiments relate to improving network connectivity and performance for a UE configured with DSDS functionality by utilizing the cellular capabilities of the further UE. For example, under conventional circumstances, the UE may be unable to perform an operation related to the network connection associated with one SIM because the UE is performing an operation related to the network connection associated with the other SIM. The exemplary embodiments mitigate the adverse effects of sharing components for DSDS functionality by configuring the UE to perform operations using a first subscription (e.g., SIM 1 or eSIM 1) and the further UE to perform operations using a second subscription (e.g., SIM 2 or eSIM 2).

To provide a general example, consider the following exemplary scenario. The UE is participating in a voice call over the network connection associated with SIM 1. As mentioned above, under conventional circumstances, the UE may be unable to perform operations related to the network connection associated with SIM 2 for the duration of the voice call over the network connection associated with SIM 1. However, according to various exemplary embodiments, if the further UE is provisioned with eSIM 1, the UE may handover the voice call associated with SIM 1 to the further UE. Accordingly, the voice call may be continued via the further UE while the UE performs operations related to the network connection associated with SIM 2. Alternatively, if the further UE is provisioned with eSIM 2, the further UE may perform operations related to the network connection for the subscription associated with SIM 2 while the voice call is performed by the UE over the network connection associated SIM 1. Thus, the UE may perform operations related to one of the network connections associated with one of the subscriptions (e.g., the subscription for SIM 1 and eSIM 1 or the subscription for SIM 2 and eSIM 2) while the further UE performs operations related to the other subscription.

The exemplary embodiments are not limited to DSDS functionality and may apply to other configurations in which the UE is capable of establishing a plurality of independent network connections. For example, the UE may be equipped with more than two SIMs. Accordingly, the exemplary embodiments may apply to a UE that is equipped with more than two SIMs and is configured to be paired with a further UE via a short-range communication protocol.

The exemplary embodiments may also apply to single radio LTE (SRLTE). In accordance with SRLTE, the UE may be equipped with one SIM. However, in accordance with SRLTE, the UE may maintain a connection to the LTE network and a connection to a legacy network. Like DSDS, when in a SRLTE operating mode, the UE may be configured to use the same components for the connection to the LTE network and the connection to the legacy network. Conventionally, when one connection is being utilized to exchange information and/or data with the network, the UE may experience no service or limited service on the other connection. Accordingly, the exemplary embodiments may also apply to a UE with SRLTE functionality and configured to be paired with a further UE via a short-range communication protocol.

FIG. 1 shows a network arrangement 100 according to the exemplary embodiments. The network arrangement 100 includes UEs 110, 112. Those skilled in the art will understand that the UEs 110, 112 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of two UEs 110, 112 is only provided for illustrative purposes.

Each of the UEs 110, 112 may be configured to communicate directly with one or more networks. In the example of the network configuration 100, the networks with which the UEs 110, 112 may wirelessly communicate with are a LTE radio access network (LTE-RAN) 120, a legacy radio access network (RAN) 122 and a wireless local access network (WLAN) 124. However, the UEs 110, 112 may also communicate with other types of networks (e.g., 5G new radio (NR), etc.) and the UEs 110, 112 may also communicate with networks over a wired connection. Therefore, the UEs 110, 112 may include an LTE chipset to communicate with the LTE-RAN 120, a legacy chipset to communicate with the legacy RAN 122 and an ISM chipset to communicate with the WLAN 124.

The UE 110 may be configured with DSDS functionality. Accordingly, in certain operating modes, the UE 110 may establish a first network connection using SIM 1 and a second network connection with a network using SIM 2. The first network connection and the second network connection may be independent from one another and exist simultaneously. In the example of the network configuration 100, the UE 110 is camped on the eNB 120A for both the first and second network connections. However, this is merely provided for illustrative purposes. In an actual network arrangement, the UE 110 may camp on a first cell corresponding to a first network for the first network connection and a second cell corresponding to a second network for the second network connection.

The UEs 110, 112 may communicate with one another without using the networks 120-124. For example, the UEs 110, 112 may communicate with one another using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In one exemplary scenario, if the short-range communication protocol is being used, the UE 110 and the UE 112 may have a companion relationship where the UE 110 is a source device and the UE 112 is an accessory device. Thus, in certain operating modes, the UE 112 may be configured to access network services by utilizing only the short-range communication protocol without connecting to any of the networks 120-124. In this exemplary operating mode, the UE 110 may connect to one or more of the networks 120-124 and relay data exchanged with the one or more networks 120-124 to the UE 112 over the short-range communication pathway. However, in other operating modes, the UE 112 may connect to one or more of the networks 120-124 regardless of whether the companion relationship with the UE 110 has been established.

The LTE-RAN 120 and the legacy RAN 122 may be portions of cellular networks that may be deployed by cellular service providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the LTE-RAN 120 via an evolved Node B (eNB) 120A. Those skilled in the art will understand that any association procedure may be performed for the UEs 110, 112 to connect to the LTE-RAN 120. For example, as discussed above, the LTE-RAN 120 may be associated with a particular cellular service provider where the UEs 110, 112 and/or the user thereof has a contract and credential information (e.g., stored on a SIM). Upon detecting the presence of the LTE-RAN 120, the UEs 110, 112 may transmit the corresponding credential information to associate with the LTE-RAN 120. More specifically, the UEs 110, 112 may associate with a specific cell (e.g., the eNB 120A of the LTE-RAN 120). As mentioned above, the use of the LTE-RAN 120 is for illustrative purposes and any type of network may be used. For example, the UEs 110, 112 may also connect to the Legacy RAN 122 or the 5G NR (not pictured).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110, 112 using the IP protocol. The IMS 150 may communicate with the cellular core network 130 and the Internet 140 to provide the multimedia services to the UEs 110, 112. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110, 112 in communication with the various networks.

The network arrangement 100 may further include a Commercial Mobile Alert System (CMAS) server 170 that may generate emergency messages and/or emergency message indications (e.g., pings) to be broadcast over the cellular networks 120, 122 to the UEs 110, 112. Since the CMAS messages are only broadcast over a cellular network, to comply with various regulations and/or standards the UEs 110, 112 may remain connected, in some manner, to a cellular network, even when the UEs 110, 112 have established a connection to a non-cellular network such as the WLAN 124. The network arrangement 100 shows the CMAS server 170 directly connected to each cellular network (e.g., LTE-RAN 120 and Legacy RAN 122). However, this is merely provided for illustrative purposes, CMAS server 170 may be connected to the cellular networks via the cellular core network 130.

Figure 2:
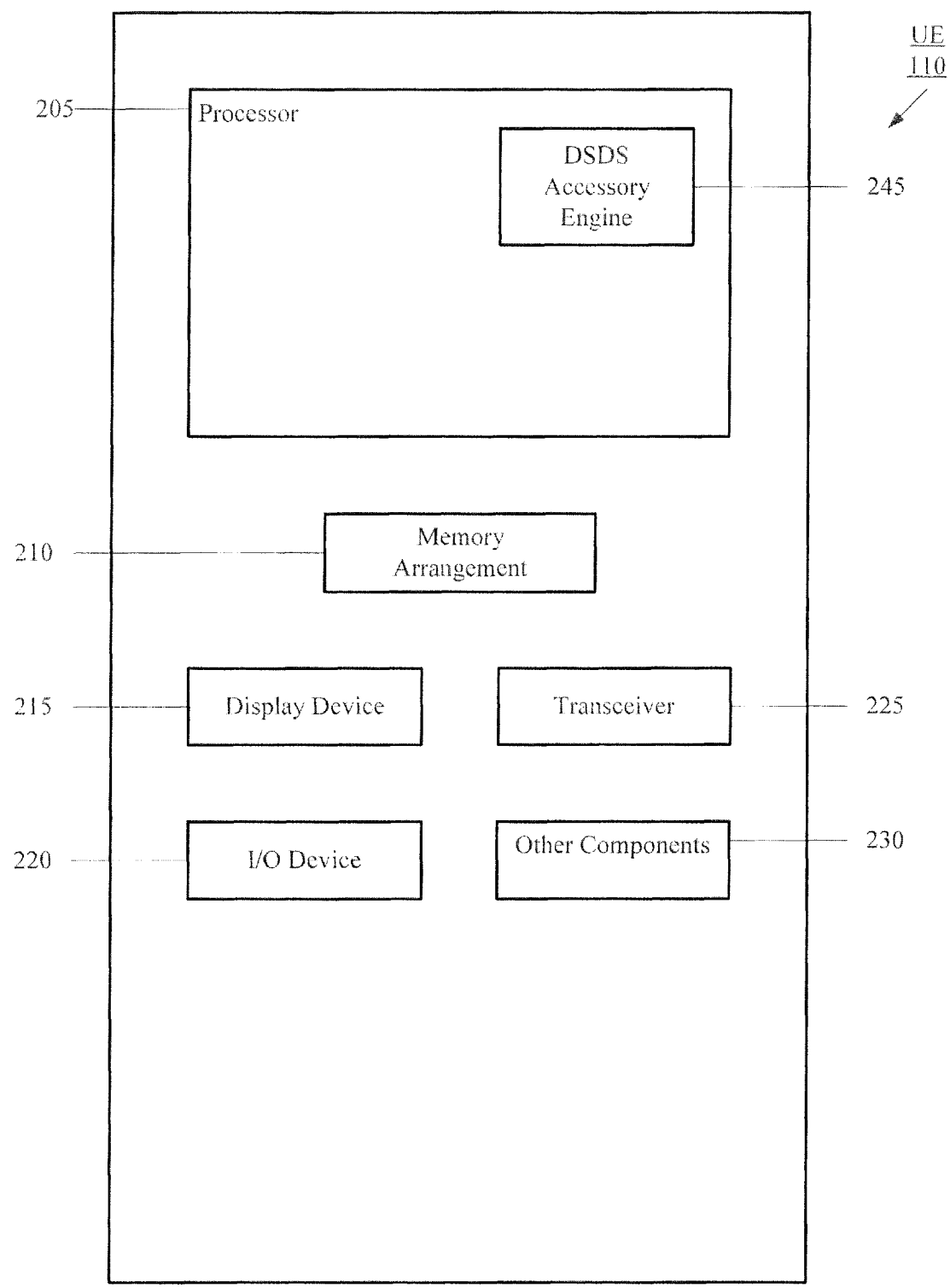
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a SIM, an audio input device, an audio output device, a battery that provides a limited power supply, a data acquisition device, ports to electrically connect the UE 110 to other electronic devices, sensors to detect conditions of the UE 110, etc. A person of ordinary skill in the art would understand that the UE 110 may also represent the UE 112.

The processor 205 may be configured to execute a plurality of engines for the UE 110. For example, the engines may include a DSDS accessory engine 245. The DSDS accessory engine 245 may monitor for predetermined conditions that may indicate that utilizing the capabilities of a connected accessory device (e.g., further UE 112) would improve the user experience for at least one of a plurality of subscriptions associated with the UE 110. When identified, the DSDS accessory engine 245 may generate a message that is to be transmitted from the UE 110 to the further UE 112 that triggers the further UE 112 to perform various operations. The message and the operations will be described in greater detail below.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the legacy RAN 122, the WLAN 124, etc. Accordingly, the transceiver 225 may operate on a variety of different frequencies or channels (e.g., set of consecutive frequencies).

Figure 3:
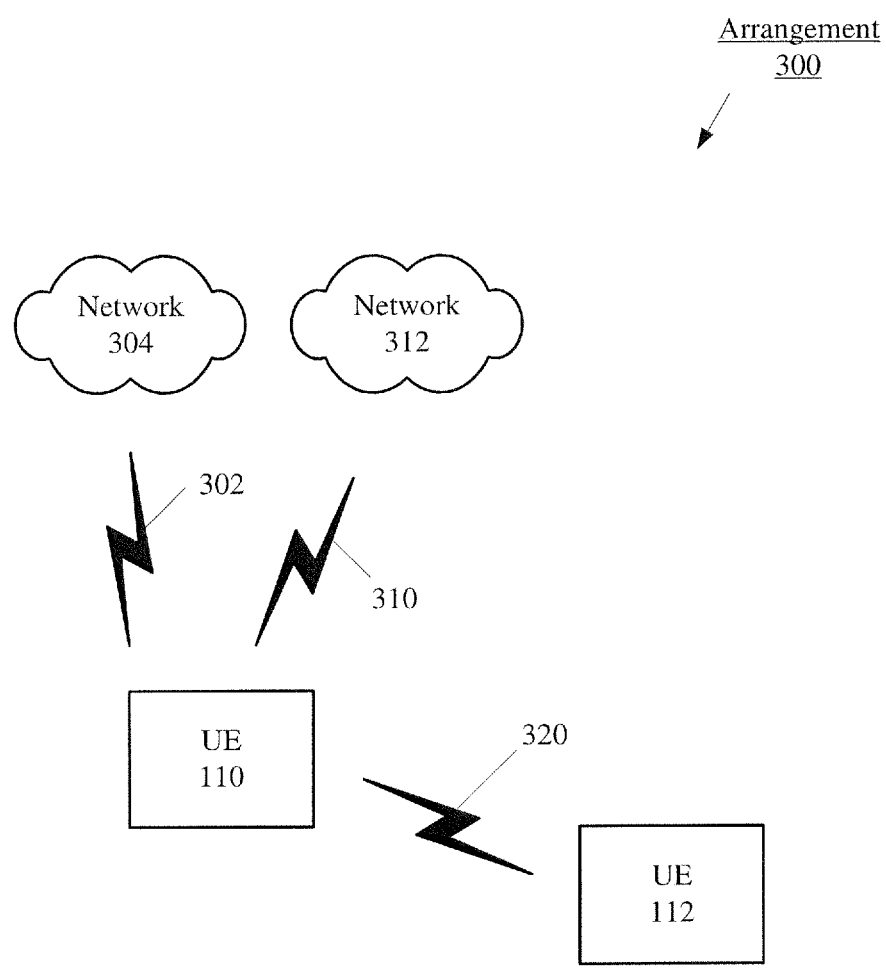
FIG. 3 shows an exemplary arrangement that includes the UE in a DSDS operating mode configured with a first network connection, a second network connection and a connection to the further UE via a short-range communication protocol according to various exemplary embodiments.

FIG. 3 shows an exemplary arrangement 300 that includes the UE 110 in a DSDS operating mode configured with a first network connection, a second network connection and a connection to the further UE 112 via a short-range communication protocol according to various exemplary embodiments. FIG. 3 will be described with regard to the network arrangement 100 of FIG. 1 and the UE 110 of FIG. 2.

The exemplary arrangement 300 illustrates the UE 110 configured with a network connection 302 to the network 304. The network connection 302 is associated with SIM 1. The UE 110 is also configured with a further network connection 310 to the network 312. The network connection 310 is associated with SIM 2. In accordance with DSDS, both network connections 302, 310 are independent from one another and maintained simultaneously.

Reference to two separate networks 304, 312 is only intended to demonstrate that the network connections 302, 304 are independent from one another. The networks with which the UE 110 may connect to may be based on the subscription corresponding to the SIM. Thus, if the subscription associated with SIM 1 and the subscription associated with SIM 2 are permitted to access the same network and/or services, the network connections 302, 304 may be to the same network. For example, both subscriptions may be with the same cellular service provider and permitted to access the same services. However, the subscriptions may also be with different cellular service providers and/or permitted to access different types of services. Accordingly, throughout this description, any reference to the network connection or corresponding network associated with either SIM 1 or SIM 2 possessing a particular characteristic or being utilized for a particular service is merely provided for illustrative purposes.

Consider the following exemplary scenario, SIM 1 is in the standby state and SIM 2 is in the standby state. When a SIM is in the standby state, the corresponding network connection is generally not being used to exchange data. However, the UE may be listening for transmissions from the networks 304, 312 over the respective network connections 302, 310. Thus, the UE 110 may perform operations to maintain both network connections 302, 310. These operations may include, but are not limited to, monitoring for paging, collecting measurement data, performing idle mode operations, etc. To provide an example, at one instance the UE 110 may tune its transceiver 225 to listen for transmissions from the network 304 over the network connection 302. Based on the received information, the UE 110 may collect measurement data for mobility management. Subsequently, the UE 110 may tune its transceiver 225 to listen for transmission from the network 312 over the network connection 310. This enables the UE 110 to maintain the network connection 302 and the network connection 310 simultaneously. Since both network connections 302, 310 are maintained in DSDS operating mode, the UE 110 may select either SIM 1 or SIM 2 to utilize for a network service (e.g., VoLTE, SMS, MMS, etc.) over the corresponding network connection. As will be described below, the SIM may be characterized as being in the active state when an exchange of data occurs between the UE and the network over the network connection associated with the selected SIM.

The UE 110 may be configured to use the same hardware, software and/or firmware components to perform operations related to the network connection associated with SIM 1 and the network connection associated with SIM 2. Since the number of operations related to a network connection associated with a SIM in the standby state is limited, there is ample time for the UE 110 to perform operations for both SIM 1 and SIM 2 using the same components when both SIM 1 and SIM 2 are in the standby state. For example, the UE 110 may switch back and forth between performing radio resource control (RRC) idle mode operations for SIM 1 and RRC idle mode operations for SIM 2.

When one of SIM 1 or SIM 2 transitions from the standby state to the active state, the UE 110 is exchanging data over the network connection associated with that SIM. Since the UE 110 may be configured to share components to perform operations for both network connections 302, 310, performing an operation related to one network connection may cause the UE 110 to be unable to perform an operation related to the other network connection. For example, if the UE 110 is exchanging packets over the network connection 302 associated with SIM 1 to perform a voice call, SIM 1 would be characterized as being in the active state. Thus, the UE 110 may be unable to perform an operation related to network connection 310 associated with SIM 2 because the transceiver 225 is being utilized to exchange packets over the network connection 302 associated with SIM 1.

From the UE 110 perspective, to exchange data with the network over one of the network connections 302, 310 the UE may need to establish an RRC connection. Continuing with the example above, to perform the voice call over the network connection 302 associated with SIM 1 the UE 110 may need to transition from an RRC idle state to an RRC connected state. Accordingly, the status of the RRC connection (e.g., RRC idle state, RRC connected state) may be indicative of the operating state of the SIM associated with that network connection. For example, when a SIM is in the standby state the UE 110 may perform RRC idle state operations. When the SIM is in the active state, the UE 110 is exchanging data with the network and thus, the UE 110 may be in the RRC connected state. However, there may be instances during the RRC connected state where the UE 110 is not utilizing the transceiver 225 to perform an operation related to that corresponding network connection. Regardless of the status of the RRC connection, when a component is not being utilized to perform an operation related to one network connection the UE 110 is capable of utilizing that component to perform an operation for the other network connection. Accordingly, while the status of the RRC connection may generally be indicative of the operating state of the SIM associated with that network connection, there is no required correlation between the status of the RRC connection and the operating state of the SIM.

In the exemplary arrangement 300, The UE 110 is also connected to the further UE 112 via connection 320. The connection 320 may be in accordance with a short-range communication protocol (e.g., BlueTooth). In some exemplary embodiments, the further UE 112 may be provisioned with a single eSIM (e.g., eSIM 1 or eSIM 2). In other exemplary embodiments, the further UE 112 may be provisioned with both eSIM 1 and eSIM 2. Thus, the UE 110 and the further UE 112 may be used for the same telephone number and/or subscription.

As mentioned above, when one of SIM 1 or SIM 2 is in the active state, various components may be unavailable for operations related to the network connection for the other SIM. This may negatively impact the user experience for the subscription associated with the other SIM. For example, if SIM 1 is in the active state, the UE 110 may not be able to monitor paging over the network connection 310 associated with SIM 2. Thus, the UE 110 may miss indications for incoming communications over the network connection 310 associated with SIM 2. The incoming communications may include, but are not limited to, an incoming voice call, a SMS, an MMS, an emergency message, etc.

The exemplary embodiments relate to utilizing the cellular capabilities of the further UE 112 to perform operations related to the subscription associated with one of the SIMS while the UE 110 performs operations related to the subscription associated with the other SIM. With regard to the example above, this may include utilizing the further UE 112 to monitor for paging for the subscription associated with SIM 2. This enables the UE 110 to avoid the adverse effects of conventional DSDS functionality where performing an operation related to the network connection associated with one of SIM 1 or SIM 2 causes the UE 110 to be unable to perform an operation related to the network connection associated the other SIM.

Figure 4:
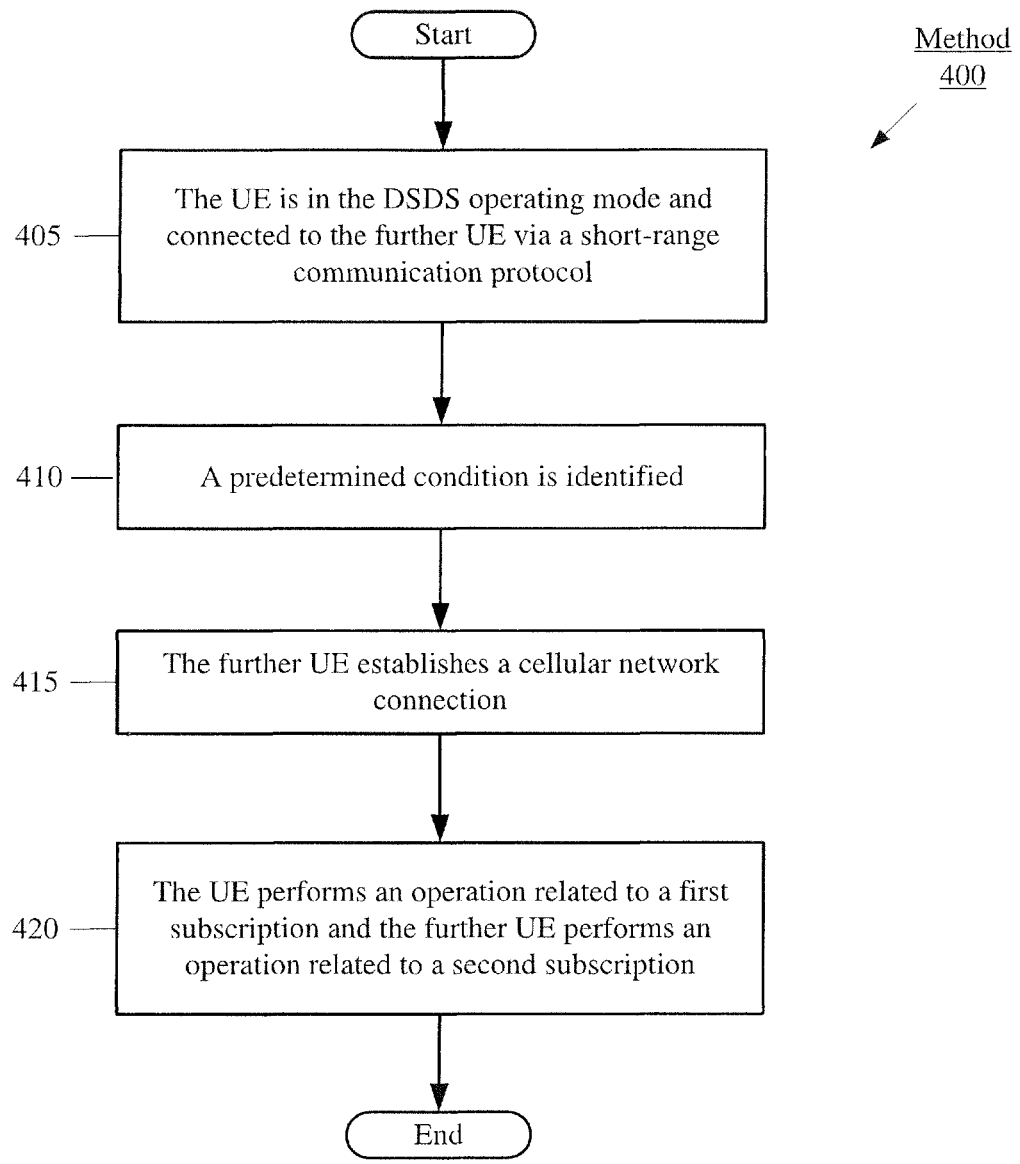
FIG. 4 shows a method for utilizing the further UE when the UE is operating in the DSDS operating mode according to various exemplary embodiments.

FIG. 4 shows a method 400 for utilizing the further UE 112 when the UE 110 is operating in the DSDS operating mode according to various exemplary embodiments. The method 400 will be described with regard to the network arrangement 100 of FIG. 1, the UE 110 of FIG. 2 and the exemplary arrangement 300 of FIG. 3.

In 405, the UE 110 is in the DSDS operating mode and connected to the further UE 112 via a short-range communication protocol.

Consider the following exemplary scenario, the UE 110 and the further UE 112 are in the arrangement 300. Accordingly, the UE 110 has a first network connection 302 with the network 304 that is associated with SIM 1 and a second network connection 310 with the network 312 that is associated with SIM 2. Further, the UE 110 and the further UE 112 are connected via connection 320 in accordance with a short-range communication protocol (e.g., BlueTooth). In this exemplary scenario, the further UE 112 is equipped with at least one of eSIM 1 and eSIM 2. However, the cellular baseband of the further UE 112 is offline.

In 410, a predetermined condition is identified. The predetermined condition may indicate that utilizing the further UE 112 may mitigate the adverse effects of conventional DSDS functionality. Either the UE 110 or the further UE 112 may identify the predetermined condition.

There may be a plurality of predetermined conditions and each may be based on at least one factor. For example, the predetermined condition may relate to, at least in part, whether a network service (e.g., voice call, IP based service, SMS, MMS, etc.) is being utilized or is to be utilized by the UE 110. The predetermined condition may also relate to the amount of battery power available at the UE 110 and/or the further UE 112. Another factor that may be considered relates to the radio frequency (RF) conditions experienced at the UE 110 and/or the further UE 112. The predetermined condition may also relate to the wireless capabilities of the further UE 112. For example, these capabilities may include, but are not limited to, the radio access technology (RAT) the further UE 112 may camp on, the frequency bands the further UE 112 may utilize for communications, the public land mobile network (PLMN) the further UE 112 may utilize, etc. Another consideration may be whether an external audio output device (e.g., wired or wireless headphones) is connected to one of the UE 110 or the further UE 112.

Compared to DSDS functionality, performing operations for a single subscription typically consumes less power than DSDS functionality. Accordingly, in one aspect, the UE 110 can conserve power by utilizing the further UE 112 to perform operations for one of the subscriptions. However, the further UE 112 may also have its own power concerns. For example, the further UE 112 may be a wearable device. The longer the wearable device can operate without being charged the better the user experience. Accordingly, in another aspect, the further UE 112 can conserve power by limiting the amount of time the further UE 112 is configured to perform operations related to one of the subscriptions. Thus, one exemplary predetermined condition may relate to a combination of the UE 110 having less than a predetermined amount of remaining battery life available (e.g., 5%, 10%, 20%, 25%, 30%, etc.) and the further UE 112 having more than a predetermined amount of remaining battery life available (e.g., 20%, 30%, 45%, 50%, etc.). This may enable the UE 110 to offload tasks to the further UE 112 during instances in which the further UE 112 has an ample amount of battery power remaining.

In some exemplary embodiments, the UE 110 may experience adequate radio frequency (RF) conditions associated with the cellular coverage for one of SIM 1 or SIM 2 and poor RF conditions associated with the cellular coverage for the other SIM. Thus, one exemplary predetermined condition may relate to a parameter or combination of parameters indicative of the RF conditions associated with one SIM being above a predetermined threshold and a parameter or combination of parameters indicative of the RF conditions associated with the other SIM being below the predetermined threshold. This enables the UE 110 to offload operations associated with cellular coverage for the SIM experiencing the adequate conditions to the further UE 112 and dedicate its resources and components to performing operations for the SIM experiencing poor RF conditions.

The predetermined condition may also relate to the UE 110 being unable to perform specific operations related to one of the network connections. For example, if the UE 110 is performing a data transfer over the network connection associated with SIM 1, various components may be unavailable to be utilized to perform an operation related to the network connection associated with the other SIM. Thus, the UE 110 may be unable to perform public land mobile network (PLMN) searches or closed subscriber group (CSG) searches for one SIM during the data transfer. Accordingly, one exemplary predetermined condition may relate to UE 110 being unable to perform a particular operation. This enables the UE 110 to offload operations associated with the coverage for one of the subscriptions during a data transfer using the other subscription.

Predetermined conditions related to a voice call will be discussed below with regard to FIG. 6 and FIG. 7. Throughout this description, reference to any particular predetermined condition is merely provided for illustrative purposes. The exemplary embodiments may incorporate any predetermined condition that indicates that utilizing the further UE 112 may mitigate the adverse effects of being configured to utilize the same component to perform operations related to a plurality of connections.

In 415, the further UE 112 establishes a cellular network connection. For instance, in this exemplary scenario the cellular baseband for the further UE 112 is offline. If the UE 110 identifies the predetermined condition in 410, the UE 110 may signal the further UE 112 to establish a cellular network connection. Alternatively, if the further UE 112 identifies the predetermined condition, the further UE 112 may be triggered to bring its cellular baseband online and establish a cellular network connection. To establish the connection, the further UE 112 may perform cell selection and camp on a cell corresponding to a cellular network.

In 420, the UE 110 performs an operation related to a first subscription and the further UE 112 performs an operation related to a second subscription. For example, in accordance with DSDS functionality, the UE 110 is associated with a first subscription to a cellular service provider that is enabled by SIM 1 and a second subscription to a cellular service provider that is enabled by SIM 2. If the further UE 112 is equipped with eSIM 1, both the UE 110 and the further UE 112 are associated with the first subscription. Similarly, if the further UE 112 is equipped with eSIM 2, both the UE 110 and the further UE 112 are associated with the second subscription. Accordingly, which operations are performed by the UE 110 and which operations are to be performed the further UE 112 may depend on the number of subscriptions associated with the further UE 112. FIG. 6 provides an example of the operations to be performed by the further UE 112 when a voice call is received for a subscription that is not associated with the further UE 112 and FIG. 7 provides an example of the operations performed by the further UE 112 when a voice call is received for a subscription that is associated with the further UE 112. However, any reference to the further UE 112 being utilized to perform a particular operation using a particular subscription is merely provided for illustrative purposes. The further UE 112 may be utilized to perform any operation using any subscription with which the further UE 112 is associated.

As mentioned above, the exemplary embodiments may also apply to SRLTE. Thus, in some exemplary embodiments, the UE 110 may implement a predetermined condition that indicates that utilizing the further UE 112 may mitigate the adverse effects of conventional SRLTE functionality. For example, the predetermined condition may relate to whether a voice call is being performed over the legacy network. If the voice call is being performed, the UE 110 may offload operations related to the LTE network during the voice call.

Figure 5:
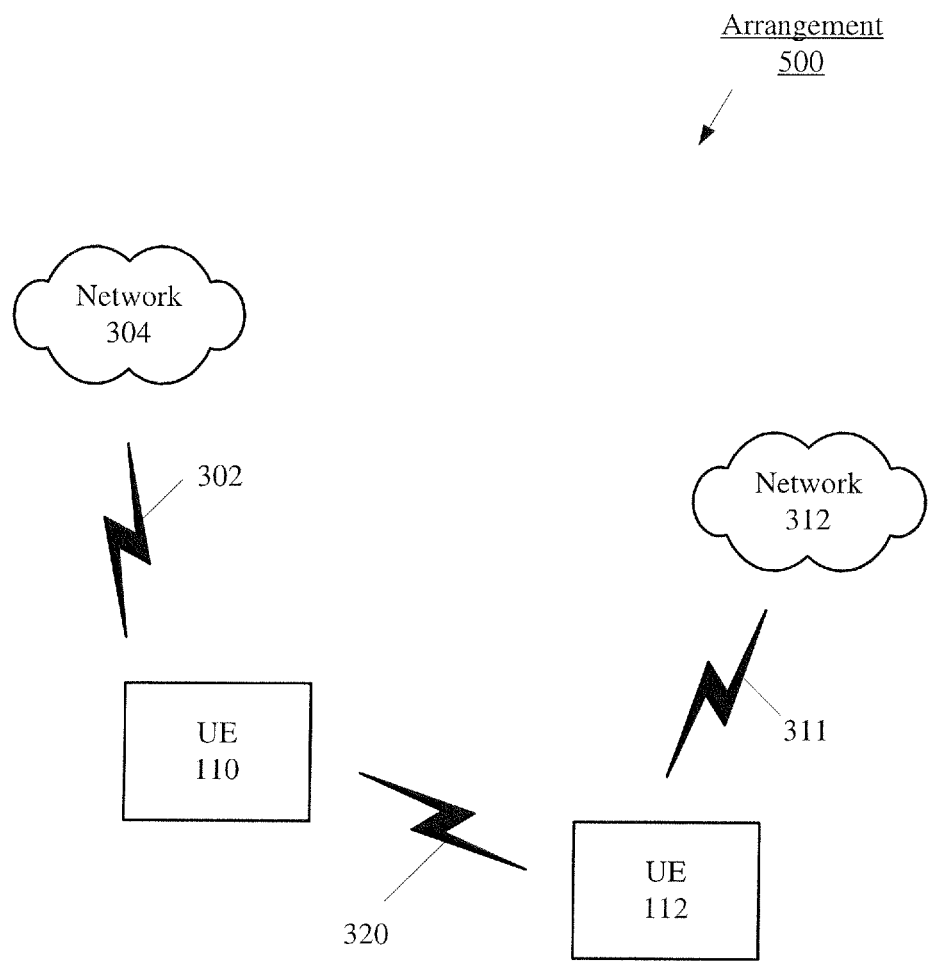
FIG. 5 shows an exemplary arrangement that includes the UE configured to perform an operation using a first subscription and the further UE configured to perform an operation using a second subscription according to various exemplary embodiments.

FIG. 5 shows an exemplary arrangement 500 that includes the UE 110 configured to perform an operation using a first subscription and the further UE 112 configured to perform an operation using a second subscription according to various exemplary embodiments. The exemplary arrangement 500 provides an example of the configuration for the UE 110 and the further UE 112 during 420 of the method 400.

As mentioned above, the UE 110 and the further UE 112 are initially in the exemplary arrangement 300 when the method 400 begins. During 420, the UE 110 and the further UE 112 may be in the exemplary arrangement 500. In this exemplary scenario, the further UE 112 is equipped with eSIM 2. Thus, the UE 110 and the further UE 112 are both associated with the second subscription. Accordingly, the further UE 112 may be utilized to perform operations for the second subscription while the UE 110 performs operations for the first subscription.

Compared to the exemplary arrangement 300, the network connection 302 associated with SIM 1 remains in the exemplary arrangement 500. Thus, the UE 110 may perform operations related to the network connection 302 associated with SIM 1.

Further, in the exemplary arrangement 500, the connection 320 between the UE 110 and the further UE 112 also remains. However, it is not necessary for the connection 320 to be maintained. For example, once the further UE 112 is configured to perform an operation using one of the subscriptions, the connection 320 may be terminated. Terminating the connection 320 may enable the UE 110 and/or the further UE 112 to conserve power by avoiding the power cost of maintaining the connection 320. This may also enable the UE 110 and the further UE 112 to exceed the proximity of the BlueTooth connection (e.g., connection 320) without experiencing a power drain performing operations intended to attempt to re-establish the connection 320.

Unlike the exemplary arrangement 300, the connection 310 between the UE 110 and the network 312 is not available in the exemplary arrangement 500. For example, SIM 2 may be in the suspended state. Instead, in the exemplary arrangement 500, the further UE 112 has connected to the network 312 via the network connection 311 using eSIM 2.

To provide a general example, initially the UE 110 and the further UE 112 are in the exemplary arrangement 300. Subsequently, the UE 110 is configured to perform a voice call over the network connection 302 using SIM 1. To avoid the adverse effects of conventional DSDS functionality, the method 400 is implemented. In 420, the UE 110 performs the voice call using SIM 1 (e.g., the first subscription) and the further UE 112 performs an operation related to the second subscription as shown in the exemplary arrangement 500. For example, the further UE 112 may monitor for paging using the second subscription. Accordingly, compared to conventional DSDS functionality where incoming communications for the second subscription (e.g., SIM 2) may be missed due to the UE 110 performing an operation related to the network connection associated with the first subscription (e.g., SIM 1), the exemplary embodiments are able to monitor for paging to the second subscription using the further UE 112. Thus, the adverse effects of conventional DSDS functionality may be mitigated by using the cellular capabilities of the further UE 112.

Figure 6:
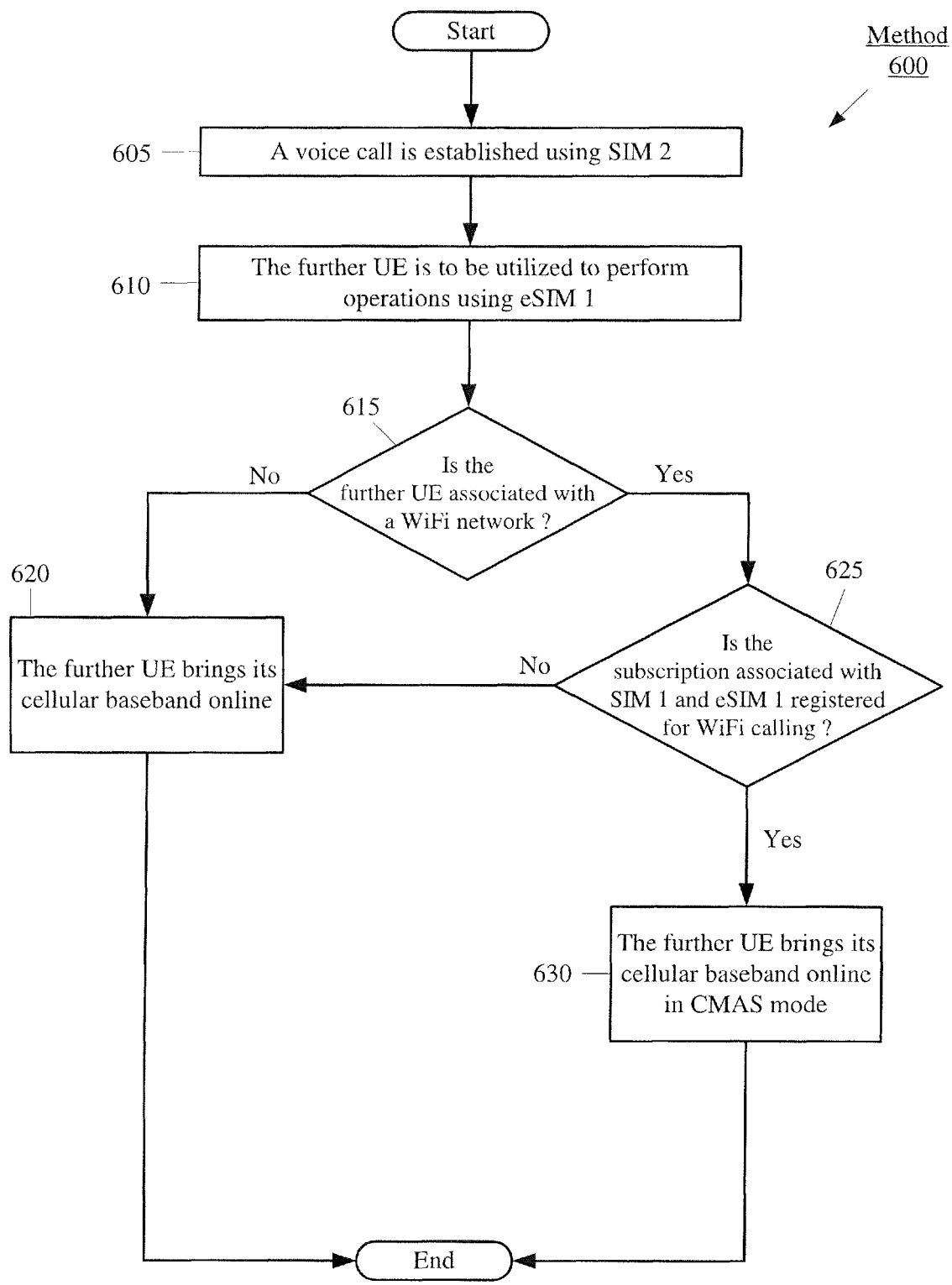
FIG. 6 shows a method for utilizing the further UE when the UE is performing a voice call using a subscription that is not associated with the further UE according to various exemplary embodiments.

FIG. 6 shows a method 600 for utilizing the further UE 112 when the UE 110 is performing a voice call using a subscription that is not associated with the further UE 112 according to various exemplary embodiments. The method 600 will be described with regard to the network arrangement 100 of FIG. 1, the UE 110 of FIG. 2, the exemplary arrangement 300 of FIG. 3 and the method 400 of FIG. 4.

Consider the following exemplary scenario, the UE 110 and the further UE 112 are in the exemplary arrangement 300. Accordingly, the UE 110 has a first network connection 302 with the network 304 that is associated with SIM 1 and a second network connection 310 with the network 312 that is associated with SIM 2. Further, the UE 110 and the further UE 112 are connected via connection 320 in accordance with a short-range communication protocol (e.g., BlueTooth). In this exemplary scenario, the further UE 112 is equipped with eSIM 1 and the cellular baseband of the further UE 112 is offline.

In 605, a voice call is established over the network connection 310 using SIM 2. For example, the UE 110 may establish a mobile originating (MO) or a mobile terminating (MT) voice call for the telephone number associated with SIM 2.

In 610, the UE 110 determines that the further UE 112 is to be utilized to perform operations using eSIM 1. This determination may be based on identifying the predetermined condition in 410 of the method 400. Accordingly, the predetermined condition may be based on, at least in part, the establishment of a voice call at the UE 110. In some exemplary embodiments, the predetermined condition may also include a time factor related to the duration of the voice call. For example, a timer may be initiated based on the establishment of the voice call. If the voice call ends prior to the expiration of the timer, the further UE 112 may not be utilized to perform cellular operations for one of the subscriptions. If the timer expires, the further UE 112 may be utilized. This allows the further UE 112 to be utilized if the voice call exceeds a certain amount of time while avoiding the power cost of establishing and maintaining a cellular network connection during a voice call that lasts for a short duration. The time may be set to expired based on any appropriate predetermined value (e.g., 10 milliseconds (ms), 500 ms, 3 seconds, 7 seconds, 45 seconds, 1 minute, 2 minutes, 5 minutes, etc.).

Based on the determination in 610, the UE 110 may send a signal to the further UE 112 via the connection 320. The signal may trigger the further UE 112 to perform an operation using eSIM 1. However, as will be described below in 615-630, the type of operations that may be performed by the further UE 112 may depend on various factors.

In 615, it is determined whether the further UE 112 is associated with a WiFi network (e.g., WLAN 124). The UE 110 and the further UE 112 may communicate periodically regarding their respective configurations. In some exemplary embodiments, the UE 110 may make the determination in 615 based on information received from the further UE 112. In other exemplary embodiments, the further UE 112 may make the determination based on the further UE 112 being triggered to perform an operation using eSIM 1.

If the further UE 112 is not associated with the WiFi network, the method 600 continues to 620. In 620, further UE 112 brings its cellular baseband online. This enables the further UE 112, to camp on a cell of a cellular network. Once camped, the further UE 112 may monitor for paging to receive incoming communications for the subscription associated with SIM 1 and eSIM 1. This also enables the further UE 112 to monitor for CMAS messages. Thus, in 620, the UE 110 is performing a voice call over the network connection associated with SIM 2 while the further UE 112 is performing an operation related to the subscription associated with SIM 1 and eSIM 1. Subsequently, the method 600 ends.

Under conventional circumstances, the UE 110 would not be capable of adequately monitoring for incoming communications associated with SIM 1. For example, the UE 110 may transition SIM 1 in to the suspended state or the UE 110 may not have any components available to perform operations related to the network connection associated with SIM 1. Thus, the UE 110 would be unaware of incoming communications associated with SIM 1 while performing the voice call using SIM 2. By utilizing the further UE 112 to monitor for incoming communications, the user would be aware of an incoming voice call for the telephone number associated with SIM 1 during the voice call over the network connection associated with SIM 2.

Returning to 615, if the further UE 112 is associated with the WiFi network, the method 600 continues to 625. In 625, it is determined whether the subscription associated with SIM 1 and eSIM 1 is registered for WiFi calling. If registered for WiFi calling, the method 600 continues to 630. If WiFi calling is not available, the method 600 continues to 620.

In 630, the further UE 112 brings its cellular baseband online in CMAS mode. CMAS mode may refer to a power efficient mode of operation during which information and/or data related to CMAS messages are processed while other operations related to the cellular network connection are limited, omitted and/or delayed. However, reference to CMAS mode is merely exemplary, as there may be similar modes of operation referred to by different names. Subsequently, the method 600 ends.

CMAS messages are only sent over cellular networks. When the UE 110 is performing a voice call, the UE 110 may not monitor for CMAS messages for either subscription. Accordingly, by operating the cellular baseband of the further UE 112 in CMAS mode, CMAS messages are received. CMAS messages are also received when the further UE 112 is in normal mode (e.g., not associated with WiFi or not registered to WiFi calling). In this example, since the further UE 112 can perform WiFi calling, the further UE 112 may monitor for incoming communications for the subscription associated with SIM 1 and eSIM 1 over a WiFi connection. Thus, the capabilities of the further UE 112 in 620 and 630 are generally the same. However, the combination of using the WiFi calling and CMAS mode may provide the further UE 112 with greater power saving benefits.

Figure 7:
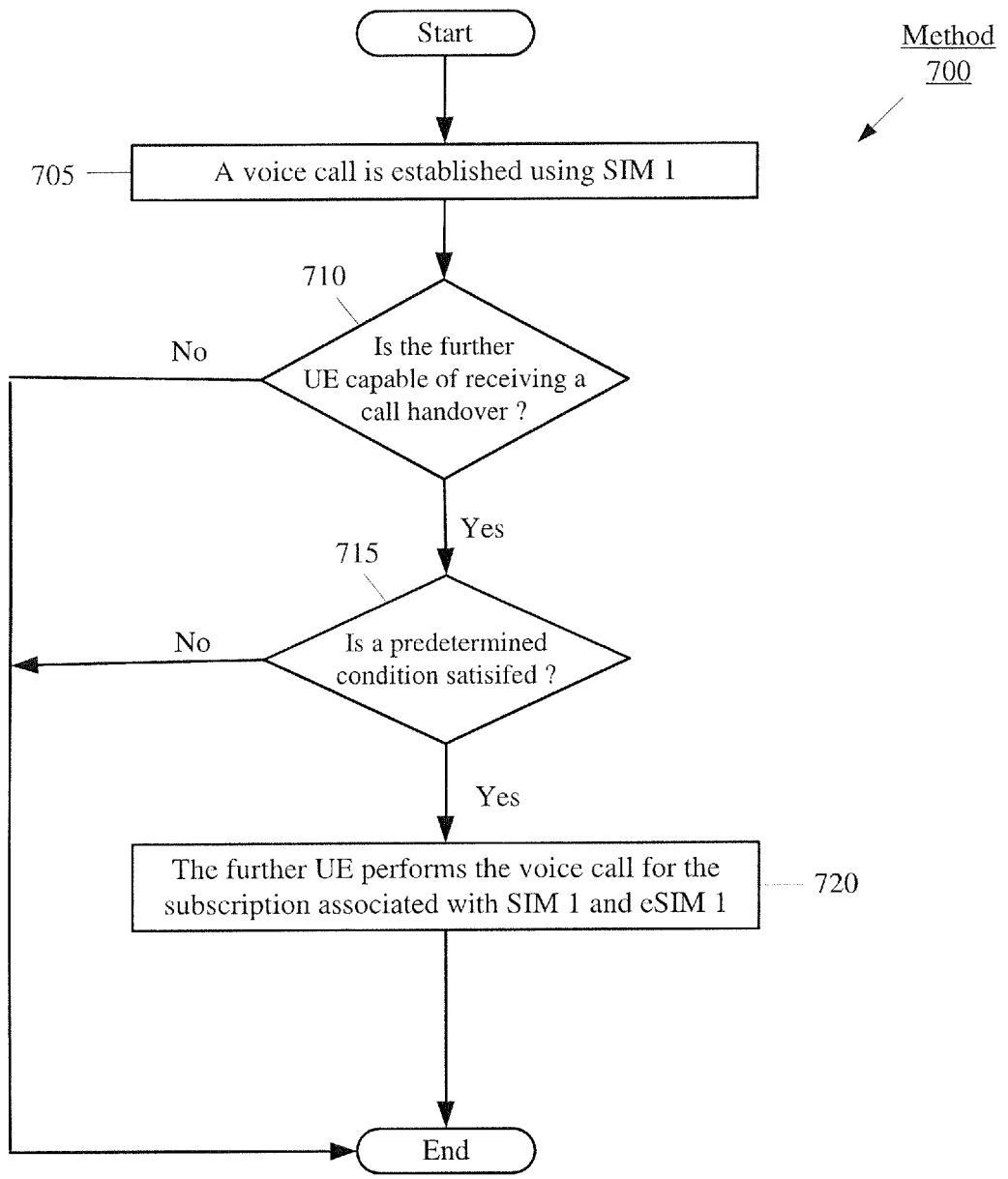
FIG. 7 shows a method for utilizing the further UE to perform a voice call according to various exemplary embodiments.

FIG. 7 shows a method 700 for utilizing the further UE 112 to perform a voice call according to various exemplary embodiments. The method 700 will be described with regard to the network arrangement 100 of FIG. 1, the UE 110 of FIG. 2, the exemplary arrangement 300 of FIG. 3 and the method 400 of FIG. 4.

Consider the following exemplary scenario, the UE 110 and the further UE 112 are in the exemplary arrangement 300. Accordingly, the UE 110 has a first network connection 302 with the network 304 that is associated with SIM 1 and a second network connection 310 with the network 312 that is associated with SIM 2. Further, the UE 110 and the further UE 112 are connected via connection 320 in accordance with a short-range communication protocol (e.g., BlueTooth). In this exemplary scenario, the further UE 112 is equipped with eSIM 1 and the cellular baseband of the further UE 112 is offline. However, in contrast to the method 600 where a voice call is performed using SIM 2, the method 700 relates to a voice call using the subscription associated with SIM 1 and eSIM 1.

In 705, a voice call is established over the network connection 310 using SIM 1. For example, the UE 110 may establish a mobile originating (MO) or a mobile terminating (MT) voice call for the telephone number associated with SIM 1.

In 710, the UE 110 determines whether the further UE 112 is capable of receiving a call handover from the UE 110. A call handover may refer to a signaling exchange between the UE 110 and the further UE 112 over the connection 320 that enables the further UE 112 to perform a voice call that was previously being performed at the UE 110. If the further UE 112 is not capable of receiving the call handover, the call remains at the UE 110 and the method 700 ends. If the further UE 112 is capable of receiving the call handover, the method 700 continues to 715.

The determination in 710 may be based on identifying the predetermined condition in 410 of the method 400. Accordingly, the predetermined condition may be based on, at least in part, the establishment of a voice call at the UE 110. The predetermined condition may also be based on the capabilities of the further UE 112. One factor may relate to the RAT that is available for the further UE 112 to camp on. For example, the voice call may be performed over the legacy RAN 122 and VoLTE may not be available. However, the further UE 112 may only be able to camp on a cell corresponding to the LTE-RAN 120. Thus, in this example, the capabilities of the further UE 112 would not allow the further UE 112 to perform the voice call.

Another factor may relate to the frequency bands that the further UE 112 is able to access and/or the RF profile of the further UE 112. For example, compared to the UE 110, the further UE 112 may not be able to access the same frequency bands. Thus, in certain locations, camping may not be possible for the further UE 112. Similarly, camping may not be possible based on the RF profile of the further UE 112. The RF profile may include parameters such as, but not limited to, received signal strength indicator (RSSI), signal to noise ratio (SNR), transmit power, etc.). These parameters may not be sufficient to permit camping and may cause the further UE 112 to experience no service or limited service.

Another factor may relate to the PLMN of the cell the further UE 112 is to camp on. For example, compared to the UE 110, the further UE 112 may camp onto cells with different PLMNs. The network service provided by different PLMNs may vary and thus, the PLMN of the cell the further UE 112 is to camp on may not be capable of supporting the characteristics of the voice call being performed at the UE 110.

Using the connection 320, the UE 110 and the further UE 112 may exchange information that enables the UE to determine the capabilities of the further UE 112. Thus, in some exemplary embodiments, the UE 110 may make the determination in 710 based on information that was received from the further UE 112 prior to the voice call being established.

In 715, the UE 110 determines whether a predetermined condition is satisfied. The predetermined condition in 710 may indicate to the UE 110 that the current configuration of the further UE 112 is capable of providing a voice call experience that is acceptable to the user. The UE 110 may identify the predetermined condition based on settings associated with subscription. Alternatively, the predetermined condition in 715 may be based on whether user input is received during the voice call.

For example, the further UE 112 may be a wearable device. The user may not want to perform a call handover to the further UE 112 unless a wireless audio output device and/or audio input device (e.g., wireless headphones) are available for use. In another example, the user may not want to perform a call handover if the voice call is a conference call. Conference calls may have longer durations than a typical voice call. Thus, the user may not want the further UE 112 to utilize the power that would be required to perform a conference call with a potentially long duration.

If the predetermined condition in 715 is satisfied, the method 700 continues to 720 where a call handover is performed. If the predetermined condition in 715 is not satisfied, the call is performed at the UE 110 and the method 700 ends.

In 720, the further UE 112 performs the voice call for the subscription, associated with SIM 1 and eSIM 1. Thus, the UE 110 is available to perform operations related to the network connection associated with SIM 2. For example, while the voice call if performed using the further UE 112, the UE 110 may monitor for incoming communications for SIM 2 and CMAS messages.

In some exemplary embodiments, the further UE 112 may be triggered to initiate a call handover back to the UE 110 based on a predetermined condition. For example, if the further UE 112 identifies that measurement data corresponding to the currently camped cell indicates that the voice call is likely to be dropped, the further UE 112 and the UE 110 may perform a call handover to the UE 110. In other exemplary embodiments, a call handover from the further UE 112 to the UE 110 may be triggered after a predetermined duration. This may enable the further UE 112 to limit the amount of power spent performing the voice call. Similarly, a call handover may be triggered if the battery level of the further UE 112 falls below a certain value.

As mentioned above, the further UE 112 may be provisioned with both eSIM 1 and eSIM 2. The examples provided above in the method 600 of FIG. 6 and the method 700 of FIG. 7 relate to utilizing the further UE 112 when it is associated with one subscription. However, when the further UE 112 is associated with both subscriptions, the further UE 112 may be utilized to perform operations for either subscription. For example, if a voice call is performed at the UE 110 using SIM 1, the further UE 112 may be utilized to either perform operations to maintain coverage for the SIM 2 (e.g., monitor for paging, perform idle mode operations, etc.) or the UE 110 may handover the voice call to the further UE 112.

Compared to the cellular capabilities of the further UE 112, the UE 110 generally provides more reliability with regard to voice call retention and higher audio quality. Accordingly, when a voice call is received for one of SIM 1 or SIM 2 and the further UE 112 is provisioned with both eSIM 1 and eSIM 2, the UE 110 may be configured to be used for the voice call while the further UE 112 is configured to perform operations to maintain coverage for the other subscription. However, in this configuration, the exemplary embodiments may apply to the UE 110 and the further UE 112 being used for either subscription.

The further UE 112 may be configured to provide assistance data to the UE 110. The assistance data may enable the UE 110 to camp quickly and reestablish coverage for one of the subscriptions after the further UE 112 is utilized. For example, the assistance data may include information such as, but not limited to, parameters associated with the serving cell for the further UE 112, measurement data associated with neighbor cells collected by the further UE 112, system information blocks (SIBs) received over various frequency bands by the further UE 112, etc. To reestablish coverage for one of the subscriptions at the UE 110, the UE 110 may camp on a cell based on the assistance data received from the further UE 112.

The UE 110 may also utilize assistance data from the further UE 112 when the UE 110 is unable to perform an operation related for one of the subscriptions because the UE 110 is performing an operation for another subscription. For example, the UE 110 may be performing an operation such as a data transfer or paging reorganization over the network connection associated with SIM 1 and thus, the UE 110 may be unable to perform operations related to maintaining coverage for the subscription associated with SIM 2. Thus, the UE 110 may offload particular operations to the further UE 112 such as, but not limited to, collecting neighbor cell measurement data, performing a cell search, cell re-selection, out of service (OOS) recovery, PLMN search, CSG search, etc. Subsequently, the further UE 112 may provide the UE 110 with assistance data that enables the UE 110 to camp quickly and reestablish coverage for the subscription associated with SIM 2.

As mentioned above, the exemplary embodiments also apply to SRLTE. Thus, assistance data may also enable the UE 110 to camp quickly and reestablish coverage after the further UE 112 is utilized to perform operations for one of the network connections (e.g., LTE or legacy network connection). For example, while the UE 110 performs a voice call over the legacy network, the further UE 112 may collect measurement data for mobility management with regard to the LTE connection. This data may be provided to the UE 110 after the voice call over the legacy network.

The further UE 112 may be an accessory device. An accessory device may be a power limited device. Thus, the use of the further UE 112 may be limited to conserve power. To balance the benefits of the exemplary embodiments and the power cost at the further UE 112, a power budget may be implemented. For example, the further UE 112 may limit the performance of an operation to an overall duration over a particular time window. In another example, the further UE 112 may limit the performance of an operation based on the amount of power consumed over a particular time window.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method comprising:
    at a user equipment (UE) configured to establish a first cellular network connection based on a first subscription, a second cellular network connection based on a second subscription and a connection to a further UE based on a short-range communication protocol:
    identifying a predetermined condition when the UE has established the first cellular network connection and the second cellular network connection;
    transmitting an indication to the further UE based on identifying the predetermined condition, wherein a third cellular network connection is established by the further UE in response to the indication, wherein the third cellular network connection is based on one of the first subscription or the second subscription; and
    declaring no service for one of the first cellular network connection or the second cellular network connection based on the third cellular network connection, wherein the no service is declared for the one of the first subscription or the second subscription that the further UE is using for the third cellular connection.

2. The method of claim 1, wherein the predetermined condition is based on whether the UE is performing a voice call using the first subscription.

3. The method of claim 2, further comprising:
    initiating a call handover to the further UE based on the UE and the further UE being associated with the first subscription.

4. The method of claim 2, wherein the further UE monitors paging for the second subscription based on the UE and the further UE being associated with the second subscription.

5. The method of claim 1, wherein the predetermined condition is based on a first predetermined threshold corresponding to a first battery power parameter of the UP and a second predetermined threshold corresponding to a second battery power parameter of the further UE.

6. The method of claim 1, wherein the predetermined condition is based on a first radio frequency (RF) parameter corresponding to the first cellular network connection and a second RF parameter corresponding to the second cellular network connection.

7. The method of claim 1, wherein the UE is configured with a dual-sim dual-standby operating mode.

8. The method of claim 1, further comprising:
receiving assistance data from the further UE; and
camping on a cell based on the assistance data.

9. The method of claim 8, wherein the assistance data includes at least one of neighbor cell measurement data and a system information block (SIB).

10. A method comprising:
at a user equipment (UE) configured to connect to a further UE based on a short-range communication protocol, wherein the further UE is configured with a first cellular network connection based on a first subscription and a second cellular network connection based on a second subscription:
receiving an indication from the further UE;
in response to the indication, establishing a third cellular network connection using one of the first subscription or the second subscription, wherein the further UE declares no service for the one of the first subscription or the second subscription that the UE is using for the third cellular connection; and
performing an operation related to the third cellular network connection.

11. The method of claim 10, further comprising:
receiving a call handover from the further UE based on the UE and the further UE being associated with the first subscription.

12. The method of claim 11, wherein receiving the call handover is further based on a connection to a wireless audio output device.

13. The method of claim 11, further comprising:
after the call handover is performed, initiating a further call handover to the further UE.

14. The method of claim 13, wherein the further call handover is initiated based on a predetermined duration.

15. The method of claim 10, further comprising:
monitoring paging for the second subscription based on the UE and the further UE being associated with the second subscription.

16. The method of claim 10, further comprising:
transmitting assistance data to the further UE, wherein the further UE is configured to camp on a cell based on the assistance data.

17. The method of claim 10, wherein the UE is equipped with an embedded subscriber identification module (eSIM) associated with at least one of the first subscription or the second subscription.

18. The method of claim 10, wherein the further UE performs at least one a cell search, a public land mobile network (PLMN) or a closed subscriber group (CSG) search for one of the first subscription or the second subscription.

19. The method of claim 10, wherein the further UE is configured with a dual-sim dual-standby operating mode.

20. A user equipment (UE), comprising:
a transceiver, configured to establish a first network connection based on a first subscription and a second network connection based on a second subscription; and
a processor configured to perform operations, comprising:
identifying a predetermined condition when the UE has established the first cellular network connection and the second cellular network connection;
transmitting an indication to the further UE based on identifying the predetermined condition, wherein a third cellular network connection is established by the further UE in response to the indication, wherein the third cellular network connection is based on one of the first subscription or the second subscription; and
declaring no service for one of the first cellular network connection or the second cellular network connection based on the third cellular network connection, wherein the no service is declared for the one of the first subscription or the second subscription that the further UE is using for the third cellular connection.

* * * * *

UNITED STATES PATENT AND TRADEMARK OFFICE
CERTIFICATE OF CORRECTION

PATENT NO. : 10,863,397 B2
APPLICATION NO. : 16/406373
DATED : December 8, 2020
INVENTOR(S) : Dhanani et al.

It is certified that error appears in the above-identified patent and that said Letters Patent is hereby corrected as shown below:

In the Claims

Claim 5, Column 20, Lines 59-60:
"condition is based on a first predetermined threshold corresponding to a first battery power parameter of the UP and a"
Should read:
"condition is based on a first predetermined threshold corresponding to a first battery power parameter of the UE and a"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*